(12) United States Patent
Park et al.

(10) Patent No.: US 8,926,198 B2
(45) Date of Patent: Jan. 6, 2015

(54) MULTI-CHANNEL OPTICAL RECEIVING MODULE

(71) Applicant: Electronics and Telecommunications Research Institute, Daejeon (KR)

(72) Inventors: Mi-Ran Park, Daejeon (KR); Hyun Soo Kim, Daejeon (KR); Jong Sool Jeong, Daejeon (KR); O-Kyun Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/939,317

(22) Filed: Jul. 11, 2013

(65) Prior Publication Data

US 2014/0270811 A1    Sep. 18, 2014

(30) Foreign Application Priority Data

Mar. 15, 2013  (KR) ......................... 10-2013-0028128

(51) Int. Cl.
*G02B 6/43* (2006.01)
*H04B 10/60* (2013.01)

(52) U.S. Cl.
CPC ..................................... *H04B 10/60* (2013.01)
USPC ................................................ 385/93; 385/89

(58) Field of Classification Search
USPC ...................................................... 385/89, 93
See application file for complete search history.

(56) References Cited

U.S. PATENT DOCUMENTS

| 7,210,861 | B2 * | 5/2007 | Nagasaka et al. | 385/88 |
| 7,556,440 | B2 | 7/2009 | Birincioglu et al. | |
| 2003/0142929 | A1 * | 7/2003 | Bartur et al. | 385/92 |

FOREIGN PATENT DOCUMENTS

| JP | 60008809 A | * | 1/1985 | ............... G02B 6/26 |
| KR | 10-1047121 B1 | | 7/2011 | |

* cited by examiner

*Primary Examiner* — Omar R Rojas
(74) *Attorney, Agent, or Firm* — Rabin & Berdo, P.C.

(57) ABSTRACT

A multi-channel optical receiving module includes a first substrate disposed on a bench, optical fibers disposed in grooves of the first substrate, a first lens disposed on the first substrate and collimating optical signals through the optical fibers, a second substrate disposed on the bench at a side of the first substrate, a light receiving device disposed on the second substrate, a second lens disposed over the light receiving device, a mirror reflecting the optical signals between the first lens and the second lens, and a block fixing the mirror. The block includes through-holes transmitting the optical signals between the first and second lenses without refraction of the optical signals.

8 Claims, 3 Drawing Sheets

MULTI-CHANNEL OPTICAL RECEIVING MODULE

CROSS-REFERENCE TO RELATED APPLICATIONS

This U.S. non-provisional patent application claims priority under 35 U.S.C. §119 to Korean Patent Application No. 10-2013-0028128, filed on Mar. 15, 2013, the entirety of which is incorporated by reference herein.

BACKGROUND

The inventive concept relates to optical receivers and, more particularly, to multi-channel optical receiving modules.

The amount of data transmitted through a network increases recently, such that a wavelength division multiplexing (WDM) technique is applied to an optical transmission system using a single-channel. In the WDM technique, data having various wavelength bands may be multiplexed or de-multiplexed and then may be transmitted and/or received through one optical fiber.

Thus, a multi-channel optical transmitting/receiving module may be required in an optical transmitting/receiving system applied with an multi-functional, high integrated and optical sub-module platform for a network based on the WDM technique. The multi-channel optical transmitting/receiving module may be a multi-channel transmitter optical sub-assembly (TOSA), a multi-channel receiver optical sub-assembly (ROSA), or a multi-channel optical sub-assembly (OSA).

Recently, the development of the multi-channel ROSA being a high sensitive optical receiving component has been demanded in a metro access network system requiring massive data transmission as a transmission distance increases. A photodiode (PD) having a high sensitive characteristic should be used for manufacturing the high sensitive ROSA. However, the high sensitive ROSA including the PD may be more difficult to fabricate, as compared with a ROSA including a general PIN photodetector.

A multi-channel optical receiving module may convert optical signals inputted in parallel through a de-multiplexer physically connected to an optical fiber into electrical signals and then may receive data transmitted by the optical signals. A passive alignment process or an active alignment process may be performed on optical devices (e.g., an optical fiber coupler, an optical de-multiplexer, and an optical signal receiver) in order to minimize loss of light generated from an optical signal generating device. In the passive alignment process, the optical devices are aligned with and then fixed at predetermined positions of a substrate. In the active alignment process, distances between the optical devices and a position where a power of the received optical signal is maximum may be determined in due consideration of the intensity of the optical signal, a beam pattern, a receiving mode of a receiving device and a receiving efficiency by an additional alignment apparatus, a laser welding apparatus, or a handwork system. The active alignment process may be performed in order to maximize an efficiency of the received signal.

The passive alignment process may simplify the alignment between the optical devices and packaging of the optical devices. However, the passive alignment process may deteriorate accuracy and reliability of the optical devices. The active alignment process should control optical powers, beam patterns, and receiving efficiencies of the optical devices, such that a processing time and a process cost may increase.

Optical connection techniques have been developed for manufacture of the multi-channel optical receiving module. For example, optical coupling methods within the optical receiving module may include a first method of directly coupling the light receiving device to a ribbon optical fiber multi-channel connector having a reflecting mirror disposed at an inclination angle of 45 degrees; a second method of coupling the light receiving device to a polymer optical waveguide having a reflecting mirror disposed at an inclination angle of 45 degrees and of connecting the polymer optical waveguide to a multi-channel optical connector; a third method of vertically coupling the light receiving device to a polymer optical waveguide and of connecting the polymer optical waveguide to a multi-channel optical connector; or a fourth method of vertically coupling the light receiving device fixed on a plastic package to a multi-channel optical connector. The light receiving device (i.e., the photodetector) may use a photo-diode array.

According to the second method, the reflecting mirror may be easily formed, and an optical coupler, an optical switcher, and a WDM device may be built into the polymer optical waveguide. Thus, function expansion of the entire module may be easily realized. However, if the module having the two-dimensional optical coupling structure is applied to a parallel connection optical receiving module having an expanded function, a great coupling loss may be caused by a distance difference between the optical fiber and the photodetector. Thus, a desired efficiency may not be obtained from the optical receiving module.

SUMMARY

Embodiments of the inventive concept may provide multi-channel optical receiving modules capable of reducing or minimizing optical loss.

In an aspect, a multi-channel optical receiving module may include: a bench; a first substrate disposed on the bench, the first substrate having grooves; optical fibers disposed in the grooves of the first substrate, respectively, the optical fibers transmitting optical signals; a first lens disposed on the first substrate to collimate the optical signals; a second substrate disposed on the bench at a side of the first substrate, the second substrate spaced apart from the first substrate; a light receiving device disposed on the second substrate, the light receiving device receiving the optical signals; a second lens disposed over the light receiving device, the second lens focusing the optical signals to the light receiving device; a mirror reflecting the optical signals between the first lens and the second lens; and a block fixing the mirror inclined from a sidewall of the first substrate toward a top surface of the second substrate, the block including through-holes, and the through-holes transmitting the optical signals between the first lens and the second lens without refraction of the optical signals.

In an embodiment, the block may include: a supporting frame fixed to the sidewall of the first substrate; a plurality of branch frames parallel to the supporting frame, the branch frames fixing the mirror; and a plurality of side plates connecting the supporting frame to the branch frames.

In an embodiment, the through-holes may include: a first through-hole defined by the supporting frame, the branch frame, and the side plates, the first through-hole adjacent to the first lens; a second through-hole extending from the first through-hole to the mirror; and a third through-hole extending from the mirror to the second lens.

In an embodiment, the first through-hole and the third through-hole may have the same size.

In an embodiment, the second through-hole may be greater than the first through-hole and the third through-hole.

In an embodiment, the mirror may be fixed to the branch frames and the side plates.

In an embodiment, the second lens may be fixed to the supporting frame, the branch frame, and the side plates.

In an embodiment, the first lens may be disposed on a portion of the first substrate which is spaced apart from the block.

In an embodiment, the first lens may include a concave lens.

In an embodiment, the multi-channel optical receiving module may further include: an amplifying device electrically connected to the light receiving device to amplify a high frequency signal, the amplifying device disposed on the second substrate; and a flexible printed circuit board fixed on the second substrate, the flexible printed circuit board electrically connected to the amplifying device.

In an embodiment, each of the grooves may have a V-shaped or U-shaped cross section.

BRIEF DESCRIPTION OF THE DRAWINGS

The inventive concept will become more apparent in view of the attached drawings and accompanying detailed description.

DETAILED DESCRIPTION OF THE EMBODIMENTS

Figure 1:
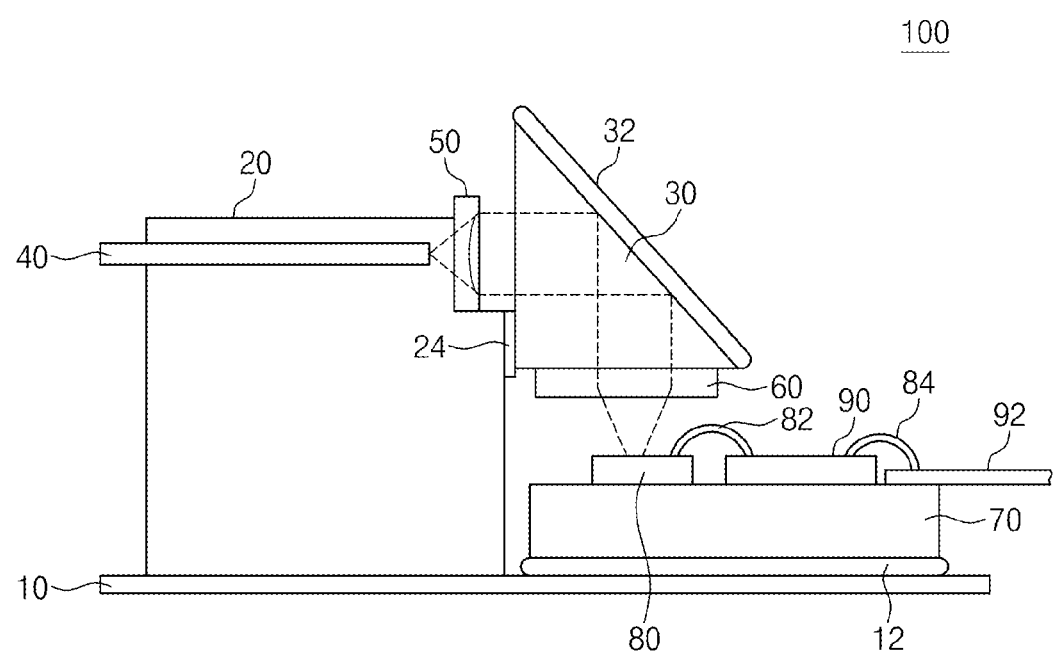
FIG. 1 is a cross-sectional view illustrating a multi-channel optical receiving module according to exemplary embodiments of the inventive concept.

The inventive concept will now be described more fully hereinafter with reference to the accompanying drawings, in which exemplary embodiments of the inventive concept are shown. The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept. In the drawings, embodiments of the inventive concept are not limited to the specific examples provided herein and are exaggerated for clarity.

The terminology used herein is for the purpose of describing particular embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element or intervening elements may be present.

Similarly, it will be understood that when an element such as a layer, region or substrate is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Additionally, the embodiment in the detailed description will be described with sectional views as ideal exemplary views of the inventive concept. Accordingly, shapes of the exemplary views may be modified according to manufacturing techniques and/or allowable errors. Therefore, the embodiments of the inventive concept are not limited to the specific shape illustrated in the exemplary views, but may include other shapes that may be created according to manufacturing processes. Areas exemplified in the drawings have general properties, and are used to illustrate specific shapes of elements. Thus, this should not be construed as limited to the scope of the inventive concept.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concept explained and illustrated herein include their complementary counterparts. The same reference numerals or the same reference designators denote the same elements throughout the specification.

Moreover, exemplary embodiments are described herein with reference to cross-sectional illustrations and/or plane illustrations that are idealized exemplary illustrations. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of example embodiments.

Figure 2:
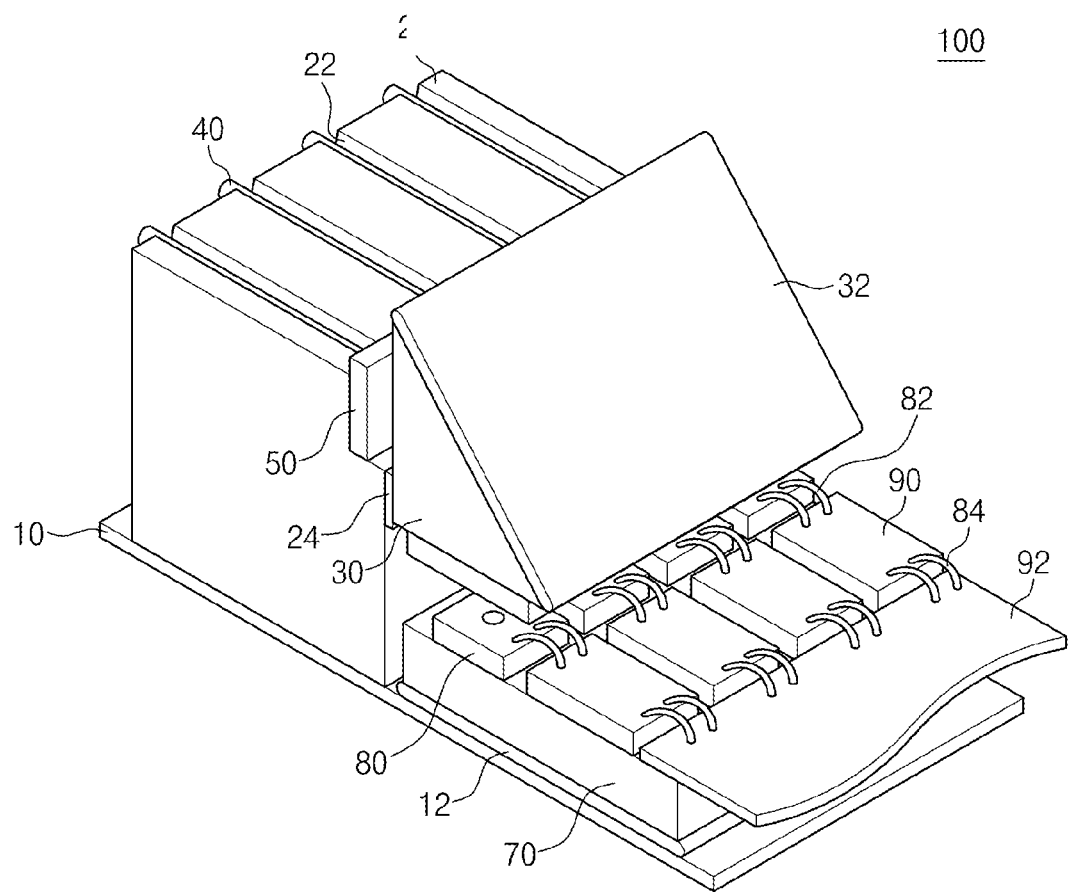
FIG. 2 is a perspective view of a multi-channel optical receiving module of FIG. 1.
Figure 3:
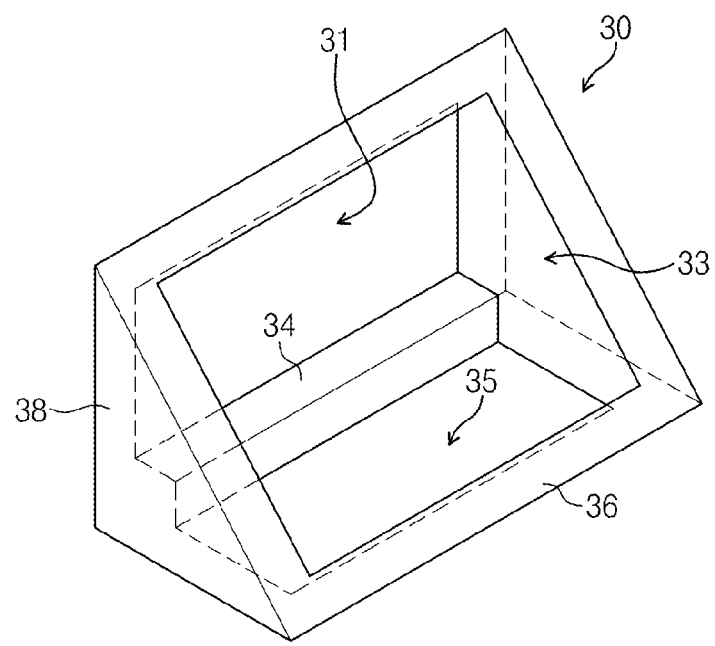
FIG. 3 is a perspective view illustrating a block of FIG. 1.

FIG. 1 is a cross-sectional view illustrating a multi-channel optical receiving module according to exemplary embodiments of the inventive concept. FIG. 2 is a perspective view of a multi-channel optical receiving module of FIG. 1. FIG. 3 is a perspective view illustrating a block 30 of FIG. 1.

Referring to FIGS. 1 to 3, a multi-channel optical receiving module 100 according to exemplary embodiments of the inventive concept may include a bench 10, a first substrate 20, a block 30, a mirror 32, optical fibers 40, a first lens 50, a second lens 60, a second substrate 70, a light receiving device 80, an amplifying device 90, and a flexible printed circuit board 92.

The bench 10 may have a flat surface. The bench 10 may include a metal. The first substrate 20 may be disposed on a portion of the bench 10. The first substrate 20 may include crystalline silicon. The first substrate 20 may have grooves 22. The optical fibers 40 may be disposed in the grooves 22, respectively. Each of the grooves 22 may have a V-shaped or U-shaped cross section.

The optical fibers 40 may be disposed in the grooves 22, respectively. The grooves 22 may actively align the optical fibers 40. Optical signals may be transmitted through the optical fibers 40. Even though not shown in the drawings, each of the optical fibers 40 may include a core transmitting the optical signal and a cladding surrounding the core.

The first lens 50 may be disposed between the mirror 32 and the optical fiber 40. The optical signals may be outputted from ends of the optical fibers 40 with a predetermined radiation angle. The first lens 50 may collimate the optical signals to the mirror 32. The first lens 50 may be fixed to the first substrate 20 adjacent to the optical fibers 40. In other words, the first lens 50 may close ends of the grooves 22. The first lens 50 may include a concave lens.

The block 30 may be fixed to a sidewall of the first substrate 20. The mirror 32 may be fixed to the block 30. The mirror 32 may be inclined with respect to the bench 10. For example, the mirror 32 may be disposed at an inclination angle of about 45 degrees with respect to the flat surface of the bench 10. The block 30 may include a plastic or polymer synthetic resin formed by an injection molding method. The mirror 32 and the block 30 may be fixed to each other by a melting and bonding process. The block 30 may transmit the optical signals to the mirror 32 without refraction of the optical signals. The mirror 32 may change a traveling path of the optical signal between the first lens 50 and the second lens 60.

The block 30 may include a supporting frame 34, branch frames 36, and side plates 38. The supporting frame 34 may be fixed to the sidewall of the first substrate 20 by a second adhesive 24. The branch frames 36 may be parallel to the supporting frame 34. The mirror 32 may be fixed to the branch frames 36. The mirror 32 may have a plate-shape on which a plating layer (e.g., an aluminum thin film) is formed. An edge of the mirror 32 may be fixed to the branch frames 36 and the side plates 38. The side plates 38 may connect the branch frames 36 to the supporting frame 34. The supporting frame 34, the branch frames 36, and the side plates 38 may define a first through-hole 31 and a third through-hole 35. The first through-hole 31 may be adjacent to the first lens 50.

The first through-hole 31 and the third through-hole 35 may have the same size. The branch frames 36 and the side plates 38 may define a second through-hole 33. The second through-hole 33 may be greater than the first and third through-holes 31 and 35. This is because the second through-hole 33 is inclined with respect to the first and third through-holes 31 and 35. The optical signals may be transmitted through the first to third through-holes 31, 33, and 35. The first and second through-holes 31 and 33 may transmit the optical signals between the first lens 50 and the mirror 32 without the refraction of the optical signals. Likewise, the second and third through-holes 33 and 35 may transmit the optical signals between the mirror 32 and the second lens 60 without the refraction of the optical signals. The optical signals may be transmitted through air between the first lens 50 and the mirror 32 and/or between the mirror 32 and the second lens 60 without the refraction thereof. In a general art, an optical signal may be refracted through a medium to cause optical loss. However, according to the embodiments of the inventive concept, the block 30 may transmit the optical signals without optical loss.

Thus, the multi-channel optical receiving module 100 according to the embodiments may reduce or minimize the optical loss.

The second lens 60 may be fixed to the supporting frame 34, the branch frame 36, and the side plates 38. The block 30 and the second lens 60 may be fixed to each other by a melting and bonding process. The second lens 60 may focus the optical signal on the light receiving device 80. The light receiving device 80 may include a photodiode.

The second substrate 70 may be disposed on the bench 10 at a side of the first substrate 20. The second substrate 70 may be spaced apart from the first substrate 20. The substrate 20 may fix the light receiving device 80, the amplifying device 90, and the flexible printed circuit board 92. The light receiving device 80, the amplifying device 90, and the flexible printed circuit board 92 may be electrically connected to each other by first and second interconnections 82 and 84. The light receiving device 80 may convert the optical signal into a high frequency electrical signal. The first interconnections 82 may electrically connect the light receiving device 80 to the amplifying device 90. The amplifying device 90 may amplify the high frequency electrical signal. The second interconnections 84 may electrically connect the amplifying device 90 to the flexible printed circuit board 92. The flexible printed circuit board 92 may use the electrical signal to generate a control signal and a communication signal.

The second substrate 70 may be fixed to the flat surface of the bench 10 by a first adhesive 12. Before the second substrate 70 is fixed to the bench 10 by the adhesive 12, the light receiving device 80 on the second substrate 70 may be passively aligned. The second substrate 70 may be fixed to a position where the intensity of the optical signal received by the light receiving device 80 is the maximum. The second substrate 70 may be a photodetector carrier.

As described above, the multi-channel optical receiving module according to the aforementioned embodiments may include the bench, the first substrate, the second substrate, the optical fibers, the first lens, the block, the mirror, the second lens, and the light receiving device. The optical fibers may transmit the optical signals to the mirror on the first substrate. The optical signals may be collimated to the mirror by the first lens. The block may transmit the optical signals through the through-holes and may fix the mirror in the state that the mirror is inclined. Additionally, the block may transmit the optical signals from the mirror to the second lens through the through-holes. The optical signals may be transmitted between the first lens and the mirror and/or between the mirror and the second lens without the refraction. Thus, the block may reduce or minimize the optical loss of the optical signals.

As a result, the multi-channel optical receiving device according to the embodiments may reduce or minimize the optical loss.

While the inventive concept has been described with reference to example embodiments, it will be apparent to those skilled in the art that various changes and modifications may be made without departing from the spirit and scope of the inventive concept. Therefore, it should be understood that the above embodiments are not limiting, but illustrative. Thus, the scope of the inventive concept is to be determined by the broadest permissible interpretation of the following claims and their equivalents, and shall not be restricted or limited by the foregoing description.

What is claimed is:

1. A multi-channel optical receiving module comprising:
   a bench;
   a first substrate disposed on the bench, the first substrate having grooves;
   optical fibers disposed in the grooves of the first substrate, respectively, the optical fibers transmitting optical signals;
   a first lens disposed on the first substrate to collimate the optical signals;
   a second substrate disposed on the bench at a side of the first substrate, the second substrate spaced apart from the first substrate;

a light receiving device disposed on the second substrate, the light receiving device receiving the optical signals;
a second lens disposed over the light receiving device, the second lens focusing the optical signals to the light receiving device;
a mirror reflecting the optical signals between the first lens and the second lens;
a block fixing the mirror inclined from a sidewall of the first substrate toward a top surface of the second substrate, the block including through-holes, and the through-holes transmitting the optical signals between the first lens and the second lens without refraction of the optical signals;
a supporting frame fixed to the sidewall of the first substrate;
a plurality of branch frames parallel to the supporting frame, the branch frames fixing the mirror; and
a plurality of side plates connecting the supporting frame to the branch frames.

2. The multi-channel optical receiving module of claim 1, wherein the through-holes comprise:
a first through-hole defined by the supporting frame, the branch frame, and the side plates, the first through-hole adjacent to the first lens;
a second through-hole extending from the first through-hole to the mirror; and
a third through-hole extending from the mirror to the second lens.

3. The multi-channel optical receiving module of claim 2, wherein the first through-hole and the third through-hole have the same size.

4. The multi-channel optical receiving module of claim 2, wherein the second through-hole is greater than the first through-hole and the third through-hole.

5. The multi-channel optical receiving module of claim 1, wherein the mirror is fixed to the branch frames and the side plates.

6. The multi-channel optical receiving module of claim 1, wherein the second lens is fixed to the supporting frame, the branch frame, and the side plates.

7. A multi-channel optical receiving module comprising:
a bench;
a first substrate disposed on the bench, the first substrate having grooves;
optical fibers disposed in the grooves of the first substrate, respectively, the optical fibers transmitting optical signals;
a first lens disposed on the first substrate to collimate the optical signals;
a second substrate disposed on the bench at a side of the first substrate, the second substrate spaced apart from the first substrate;
a light receiving device disposed on the second substrate, the light receiving device receiving the optical signals;
a second lens disposed over the light receiving device, the second lens focusing the optical signals to the light receiving device;
a mirror reflecting the optical signals between the first lens and the second lens; and
a block fixing the mirror inclined from a sidewall of the first substrate toward a to surface of the second substrate, the block including through-holes, and the through-holes transmitting the optical signals between the first lens and the second lens without refraction of the optical signals,
wherein the first lens is disposed on a portion of the first substrate which is spaced apart from the block.

8. The multi-channel optical receiving module of claim 7, wherein the first lens includes a concave lens.

* * * * *